(12) United States Patent
Giangrandi (10) Patent No.: US 9,969,112 B2
(45) Date of Patent: May 15, 2018

(54) MANUFACTURING PROCESS OF SHOE WITH INTERNALLY WATERPROOFED FABRIC UPPER

(71) Applicant: Osvaldo Giangrandi, Bagnacavallo (IT)

(72) Inventor: Osvaldo Giangrandi, Bagnacavallo (IT)

(73) Assignee: CALZATURIFICIO MODA ITALIANA SRL, Bagnacavallo (RA) (IT)

( * ) Notice: Subject to any disclaimer, the term of this patent is extended or adjusted under 35 U.S.C. 154(b) by 210 days.

(21) Appl. No.: 14/627,259

(22) Filed: Feb. 20, 2015

(65) Prior Publication Data
US 2015/0352762 A1    Dec. 10, 2015

(30) Foreign Application Priority Data
Jun. 4, 2014 (IT) .............................. AN2014A0085

(51) Int. Cl.
| | |
|---|---|
| B29C 45/14 | (2006.01) |
| B29C 45/16 | (2006.01) |
| A43B 1/02 | (2006.01) |
| A43B 23/02 | (2006.01) |
| A43B 23/06 | (2006.01) |
| B29D 35/12 | (2010.01) |
| B29D 35/04 | (2010.01) |

(Continued)

(52) U.S. Cl.
CPC ............ *B29C 45/1642* (2013.01); *A43B 1/02* (2013.01); *A43B 23/0215* (2013.01); *A43B 23/0235* (2013.01); *A43B 23/06* (2013.01); *B29C 45/14* (2013.01); *B29C 45/14336* (2013.01); *B29C 45/14344* (2013.01); *B29D 35/0018* (2013.01); *B29D 35/04* (2013.01); *B29D 35/126* (2013.01); *B29D 35/0009* (2013.01); *B29L 2031/501* (2013.01); *B29L 2031/505* (2013.01)

(58) Field of Classification Search
None
See application file for complete search history.

(56) References Cited

U.S. PATENT DOCUMENTS

| | | | | |
|---|---|---|---|---|
| 2,684,502 A | * | 7/1954 | Paulve .................. | B21D 51/54 102/467 |
| 3,175,249 A | * | 3/1965 | Ferreira ............... | B29D 35/061 264/244 |

(Continued)

FOREIGN PATENT DOCUMENTS

| | | | |
|---|---|---|---|
| CA | 2755330 A1 | | 12/2011 |
| FR | 2755588 | * | 5/1998 |
| GB | 2128131 A | | 4/1984 |

OTHER PUBLICATIONS

European Search Report for corresponding Application No. EP 14 18 5501.

*Primary Examiner* — Edmund Lee
(74) *Attorney, Agent, or Firm* — Egbert Law Offices, PLLC (57) ABSTRACT

A manufacturing process is provided for a shoe with a fabric upper that is internally provided with a waterproof coating layer made of plastic material. The process includes the step of piercing of the upper in order to inject plastic material in an intermediate space between a core of a mold and the upper.

9 Claims, 9 Drawing Sheets

(51) Int. Cl.
  *B29D 35/00*  (2010.01)
  *B29L 31/50*  (2006.01)

(56) References Cited

U.S. PATENT DOCUMENTS 3,178,496 A * 4/1965 Ferreira ............... B29D 35/061
                                                    249/82
2004/0200096 A1   10/2004 Wu

* cited by examiner

MANUFACTURING PROCESS OF SHOE WITH INTERNALLY WATERPROOFED FABRIC UPPER

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present patent application for industrial invention relates to a manufacturing process of a shoe provided with an internally waterproofed fabric upper, and a molding assembly to perform the manufacturing process.

Also if following the description specifically refers to boots, the scope of the invention extends to any type of shoe provided with closed or opened upper, such as Ballet flats or Dolly shoes, sandals, sabots, and like.

2. Description of Related Art Including Information Disclosed Under 37 CFR 1.97 and 37 CFR 1.98

Known are boots composed of a rubber sole and a fabric upper fixed to the sole. In particular, the upper is provided with a structure that is similar to a sock. The upper is formed of a tubular section adapted to embrace the user's leg and of a base sack adapted to receive the foot and surround it completely. The bottom of the base sack must be exactly disposed in contact with the upper side of the sole. Generally fabric uppers are used, since this type of material can have any desired color and/or surface decoration, thus guaranteeing the aesthetic peculiarity of the boot provided with such an upper.

Nevertheless, a fabric upper is not intrinsically able to offer the self-support, resistance and waterproof properties that are compatible with the use of a boot, i.e. a type of footwear that is typically used in cold months with adverse weather conditions. For this reason, the fabric of such an upper is coated by applying an external layer of transparent or colored plastic material (preferably PVC) that, in addition to increasing the resistance and self-support properties of the upper, allows leaving the color and decoration of the fabric used to make the upper.

Such an operation is made with a special mold, which is normally formed of three cooperating parts.

The first part consists of a core that reproduces the user's leg and foot. The fabric upper to be coated with the plastic material is inserted on said core.

The second part consists of a mold die, which is preferably formed of two semi-shells, adapted to be tightened on the two sides of the core, which is already provided with the fabric upper.

The third part consists in a mold lid adapted to close the die, in contact with the bottom of the core and substantially with the bottom of the "sack" of the upper inserted on the core.

Transparent plastic material in fluid state is injected into the mold. In particular, such an injection is made by means of nozzles inserted through said lid. The plastic material injected by the nozzles penetrates between the fabric upper and the walls of the mold covering the entire surface of the upper.

After completing this step of the injection process, the lid is removed and replaced with a second lid, which is specifically adapted to mold the rubber sole directly under the bottom of the fabric upper, which is completely coated with the plastic material.

Such a technology is highly impaired by a significant drawback. The layer of transparent plastic material that consolidates externally on the fabric upper prevents the user from feeling the fabric and partially alters the visual perception of the color and/or decoration of the same fabric.

The impression generated by a boot manufactured according to the traditional technology is that the upper is directly made of a colored and/or decorated material, and not of fabric.

The purpose of the present invention is to provide a shoe with fabric upper that is waterproof and in the same time it is perceived as fabric both from the tactile and the visual viewpoint.

BRIEF SUMMARY OF THE INVENTION

The inventive idea that has allowed for achievement of such a purpose consists in applying the plastic coating layer on the inside, and not on the outside, of the upper, as in the prior art shoes.

In view of the above, although both the fabric upper and the boot are waterproof, the fabric of the upper is perceived as such on the outside of the shoe. So, the user can feel the fabric and the color and/or decoration of the fabric can maintain the initial characteristics.

Such an inventive solution is implemented by means of the process of the invention, which can be implemented by using the molding installations that are currently used, with some minor modifications, and consequently with an insignificant increase of the costs for manufacturer of similar shoes provided with fabric upper.

BRIEF DESCRIPTION OF THE SEVERAL VIEWS OF THE DRAWINGS

For explanatory reasons, the description of the invention continues with reference to the attached drawings, which only have an illustrative, not limiting value, wherein.

DETAILED DESCRIPTION OF THE INVENTION

Figure 1:
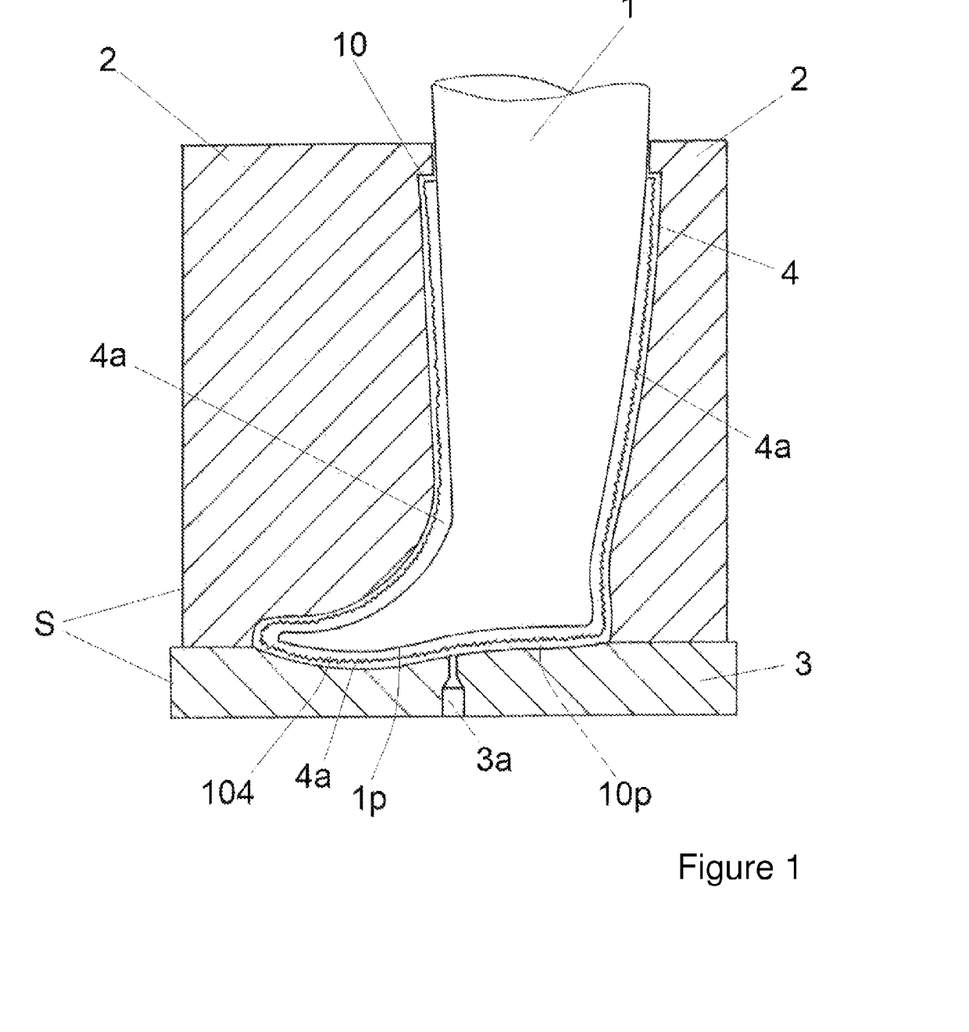
FIGS. 1 to 4 are diagrammatic sectional views of the operating steps of the process of the invention.

Referring to FIG. 1, the process of the invention provides for using a mold (S) composed of three parts.

The first part includes a core (1) that reproduces the shape of the user's leg and foot. The core (1) comprise a bottom (1p) reproducing the foot plantar. An upper (10) is made of fabric and is intended to be fit on the exterior of the core. The upper (10) has a shape substantially of a sock and has a bottom (10p) intended to be positioned under the bottom (1p) of the core.

The second part includes a die (2) of the mold (S), which comprises two semi-shells. The die (2) is adapted to surround the core (1) in order to generate a lateral gap (4) between the core (1) and the die (2).

The third part includes a lid (3) of the mold (S), which is adapted to close the die (2) substantially at the height of the bottom (1p) of said core (1), in order to generate a lower gap (104) between the lid (3) and the bottom (1p) of the core. The lower gap (104) communicates with the lateral gap (4). In this manner, a gap (4, 104) is generated between the core (1) and the mold (S) surrounding laterally and inferiorly the core (1). The lid (3) is provided with at least one hole (3a) adapted to receive a nozzle (30) (FIG. 2) to inject the plastic material in fluid state inside the mold (S).

Figure 2:
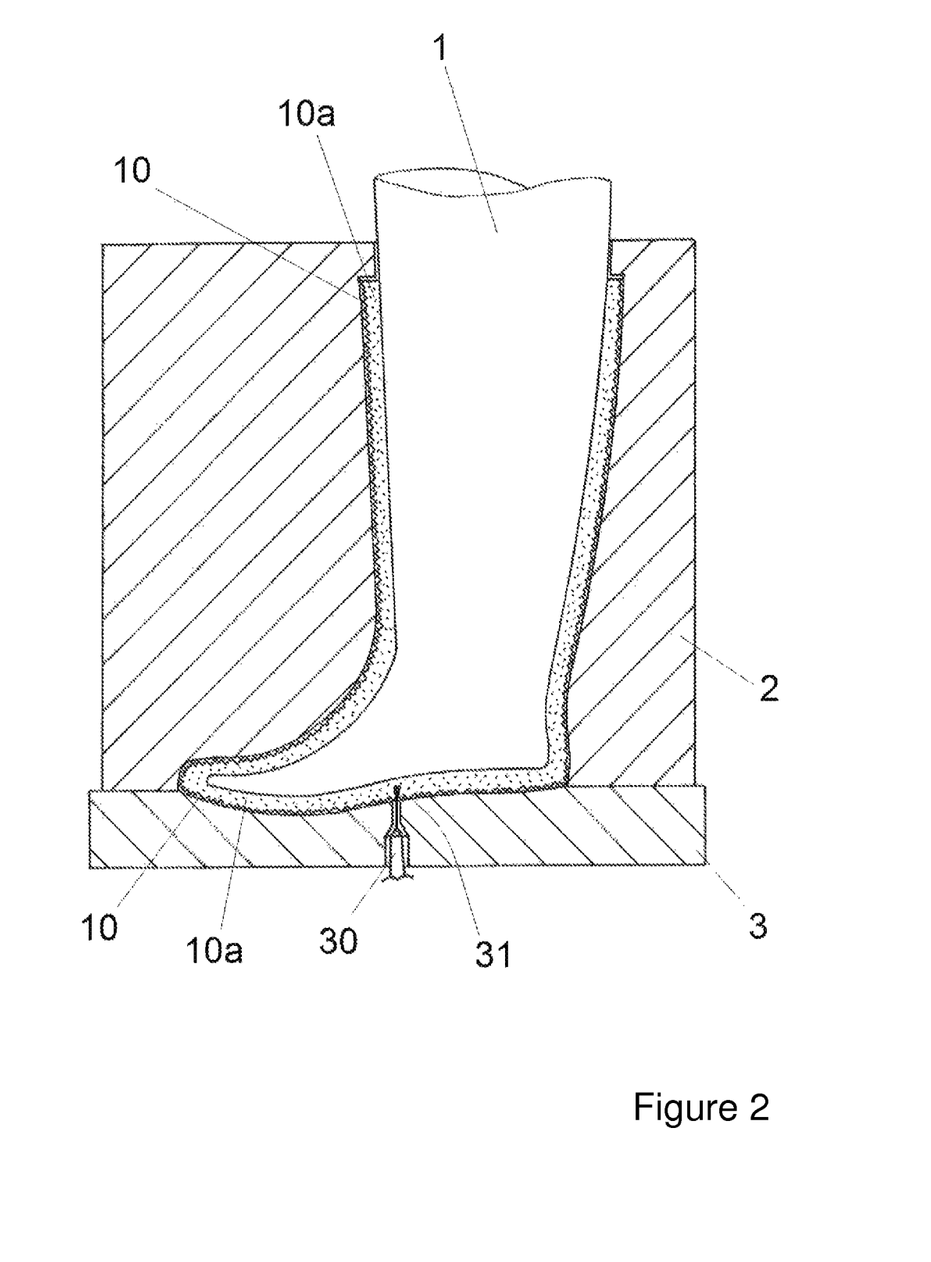

The nozzle (30) comprises a pointed head (31) which enters into the lower gap (104) of the mold and the pointed head (31) pierces the bottom (10p) of the upper in order to inject the plastic material in an intermediate space (4a) between the core (1) and the upper (10). In this manner, the plastic material can cover the interior surface of the upper, i.e. the surface of the upper facing towards the core (1).

Figure 1A:
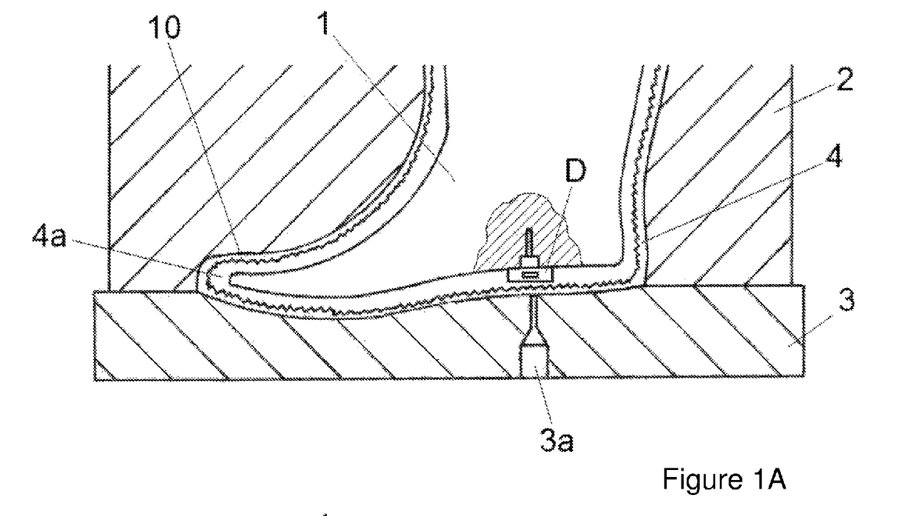
FIG. 1A is an enlarged view of FIG. 1.

Referring to FIG. 1A, the core (1) of the mold (S) is provided with one or more diffusers (D) suitable for coupling with the pointed head (31) of the nozzle in order to spread the plastic material at fluid state. The diffusers (D) are disposed under the bottom (1b) of the core and over the bottom (10p) of the upper. Each diffuser (D) is disposed in a position that corresponds to one of the holes (3a) of the lid (3).

Figure 8:
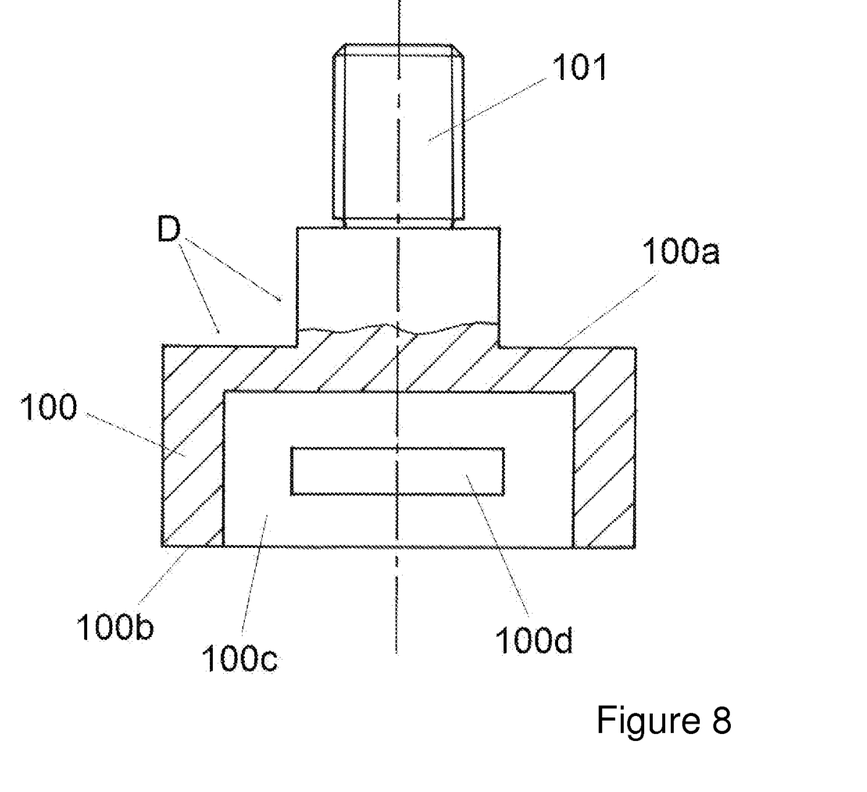
FIG. 8 is a partially sectional side view of one of the diffusers provided in the core of the mold used for the process of the invention.

Referring to FIG. 8, each diffuser (D) comprises a plate (100) having a cylindrical shape. The plate (100) has a first side (100a) abutting against the surface of the core (1) of the mold and a second side (100b) opposed to the first side (100a). The diffuser (D) comprises a fixing pin (101) protruding from the first side (100a) of the plate of the diffuser. The fixing pin (101) is adapted to be inserted into the core (1).

A chamber (100c) having a cylindrical shape is provided inside the plate (100) of the diffuser. The camber (100c) has an opening on the second side (100b) of the plate in order to receive the pointed head (31) of the nozzle. The plate (100) has lateral walls with radial slot (100d) communicating with the camber (100c) for a radial spreading of the plastic material. The radial slots (100d) are disposes at approximately half of the height of the chamber (100c).

After inserting the upper (10) onto the core (1) of the mold (S), the diffusers (D) are disposed between the core (1) and the upper (10).

In order to inject the thermoplastic material in fluid state, an injection nozzle (30) is inserted into a hole (3a) of the lid (3), in such manner that the pointed head (31) of the nozzle (30) can pierce the upper (10) and penetrate inside the chamber (100c) of a diffuser (D).

Upon injection, the plastic material in fluid state is delivered in radial direction through the radial slots (100c) of each diffuser (D), in such manner to penetrate in the intermediate space (4a) between the surface of the core (1) and the internal side of the upper (10) for the entire extension of the gap (4, 104) of the mold (S). Consequently, upon consolidation, the plastic material generates a coating layer (10a) (FIG. 2) that extends on the entire internal surface of the upper (10), both on the tubular section of the upper (10), which is adapted to receive the user's leg, and on the base sack of the upper, which is adapted to receive the user's foot.

On the contrary, the external surface of the upper (10) is not cover of said plastic material, thus maintaining the tactile and visual aspect of a fabric material.

Figure 3:
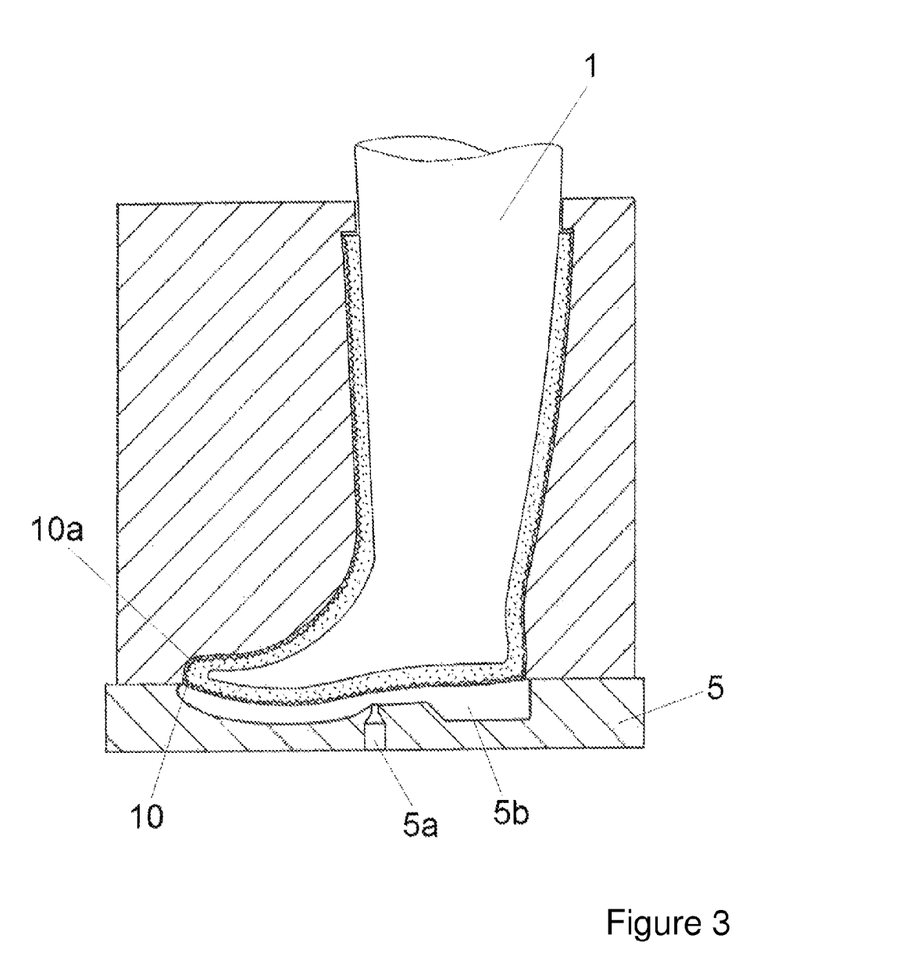
Figure 4:
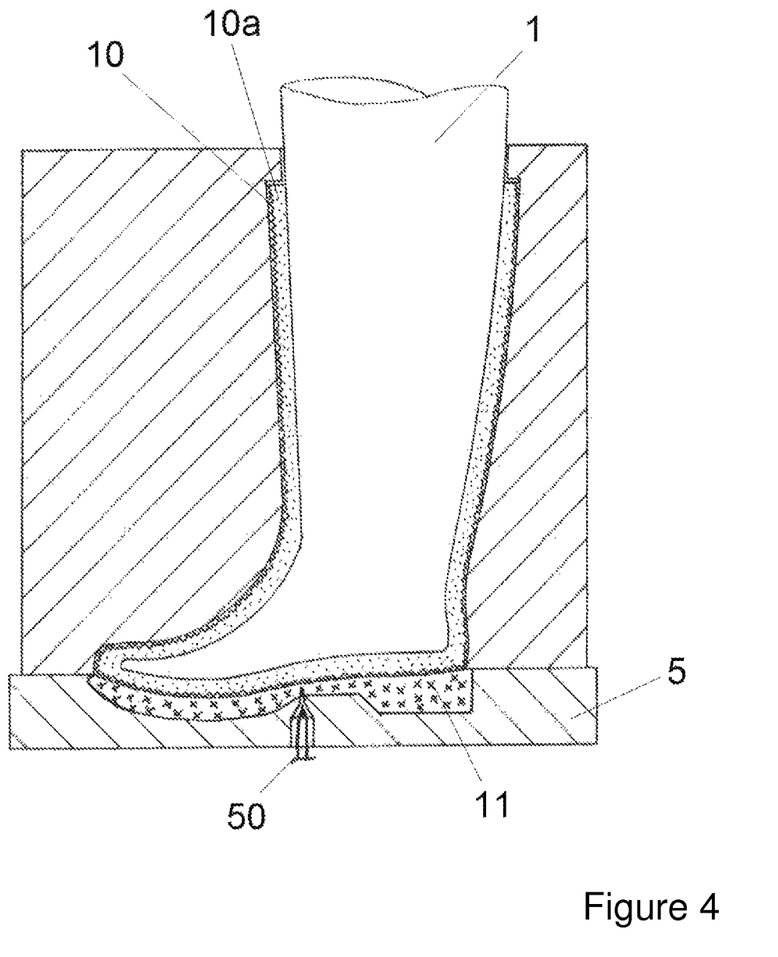

FIGS. 3 and 4 show the second step of the molding process of the shoe according to the invention, which is carried out according to traditional principles.

The first lid (3) used to inject the plastic material on the inside of the upper (10) is removed and replaced by a second lid (5) adapted to favor the molding of the sole (11) under the upper (10).

The second lid (5) is provided with a cavity (5b) that reproduces the shape of a sole (11) to be obtained and at least one hole (5a) adapted to receive an injection nozzle (50) of the plastic material.

Figure 5:
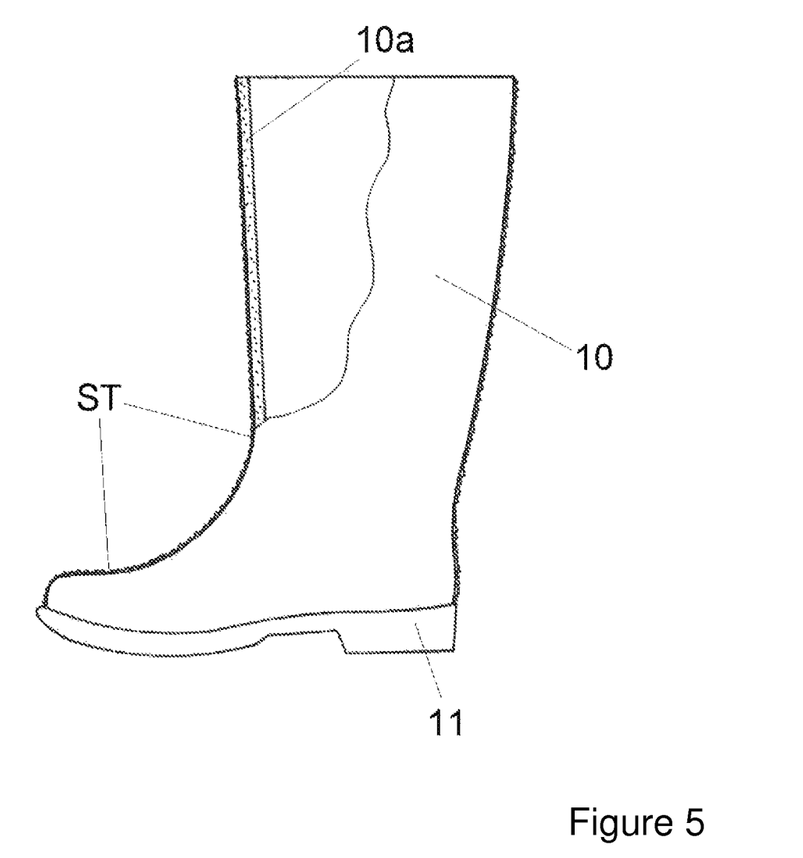
FIG. 5 is a partially sectional view of the boot obtained according to the process shown in FIGS. 1 to 4.

In particular, FIG. 4 shows the installation of an injection nozzle (50) inside the hole (5a) of the second lid and the consequent filling of the cavity (5b) of the second lid with the molding material that is used to form the sole (11). In this case a boot (ST) is obtained (FIG. 5).

As soon as the molding step of the sole (11) is completed, the entire mold (S) is opened in order to remove the boot (ST), which is now complete in all its parts, from the core (1).

The boot (ST) after being removed from the mold (S), as well as the presence of the desired plastic layer (10a) on the inside of the entire upper (10).

The versatility and efficacy of the process according to the present invention are clear also from another perspective. Whereas according to the prior art the external coating layer of plastic material is necessarily transparent in order not to conceal the fabric of the upper, the process of the invention allows for making the internal coating layer with any colored plastic material, possibly matching the color and/or decoration of the fabric used for the upper.

Likewise, in order to guarantee a higher comfort to the foot, the plastic coating layer (11) applied on the inside of the upper (10) is coated with a fabric lining (12).

Figure 6:
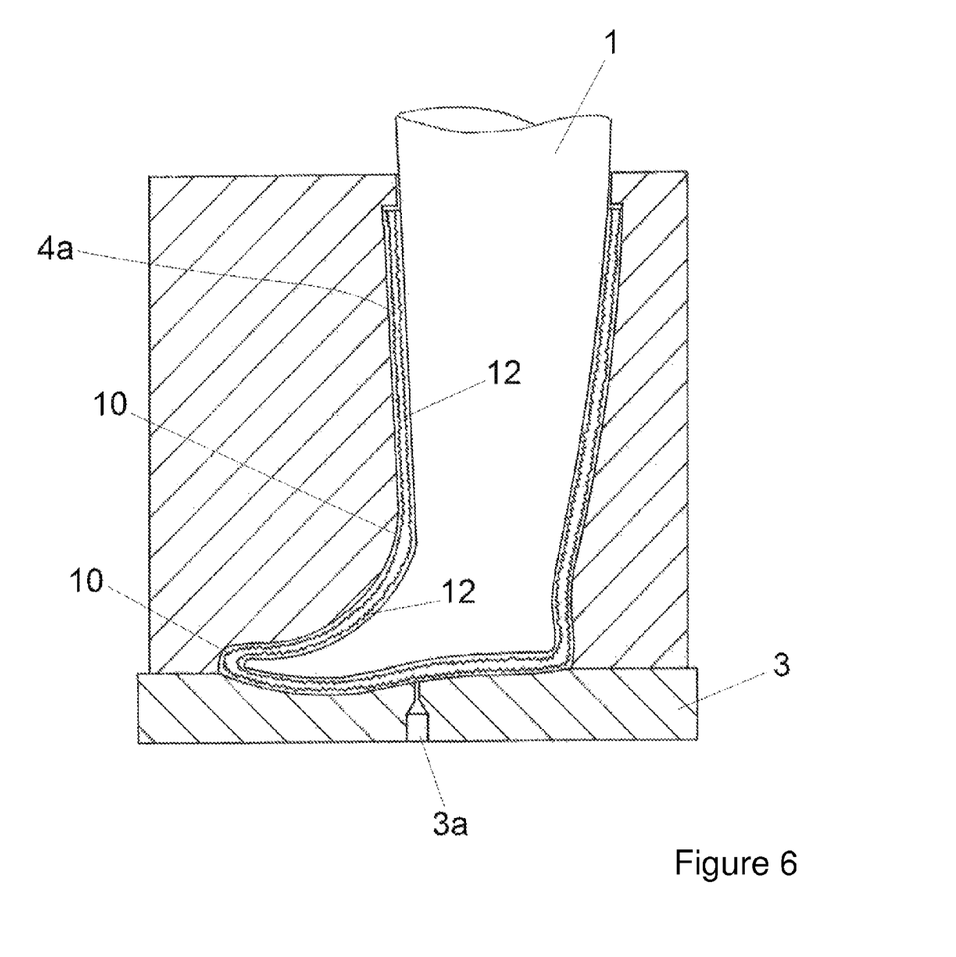
FIGS. 6 and 7 show the operating steps of a second embodiment of the process of the invention.
Figure 7:
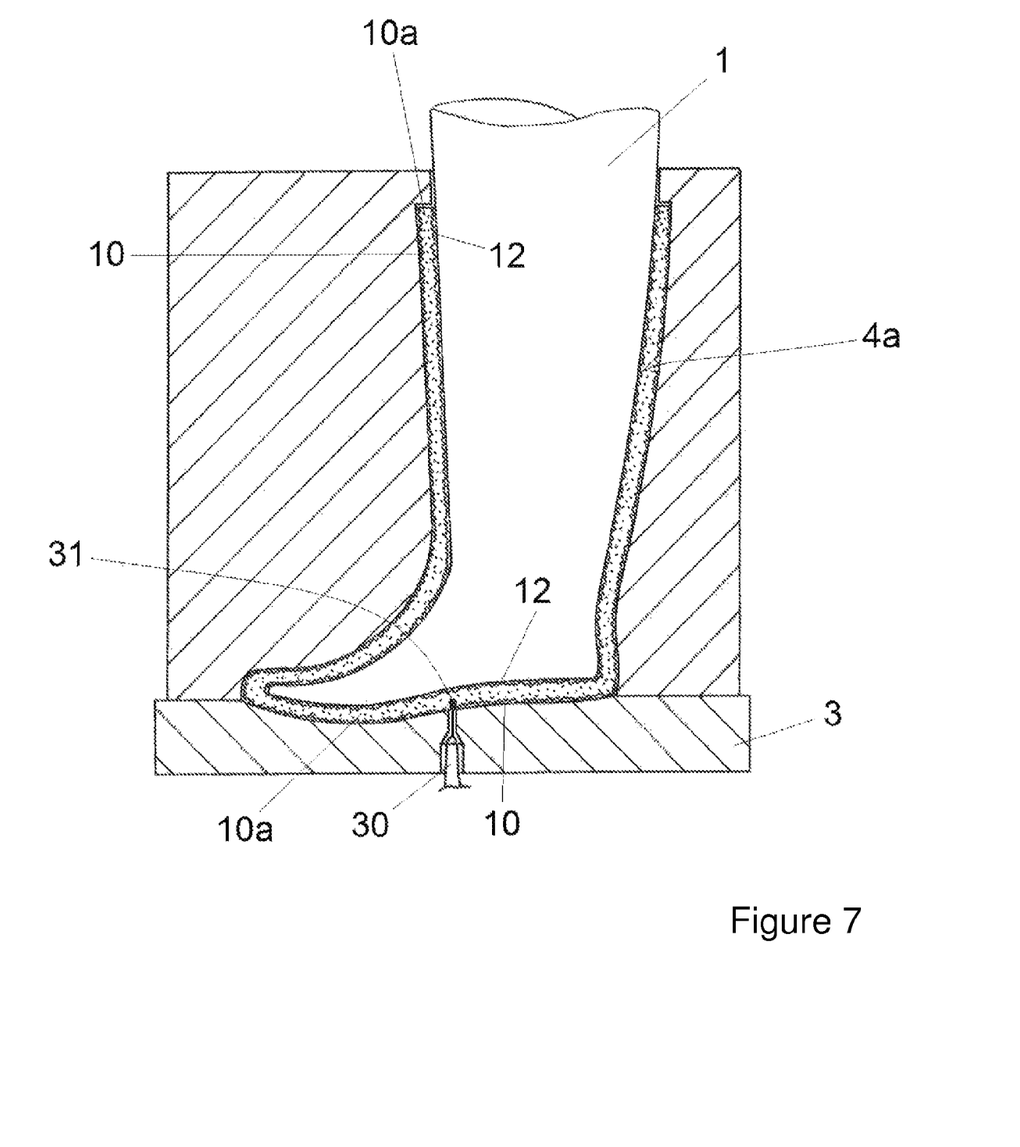

With reference to FIGS. 6 and 7, in order to obtain such an embodiment of the boot of the invention, a fabric lining (12) is provided, being shaped as a sock that reproduces both the user's leg and foot. Then, such a lining (12) is inserted on the core (1) of the mold (S), before the fabric upper (10) is inserted on the core (1), as e shown in FIG. 6.

Figure 6A:
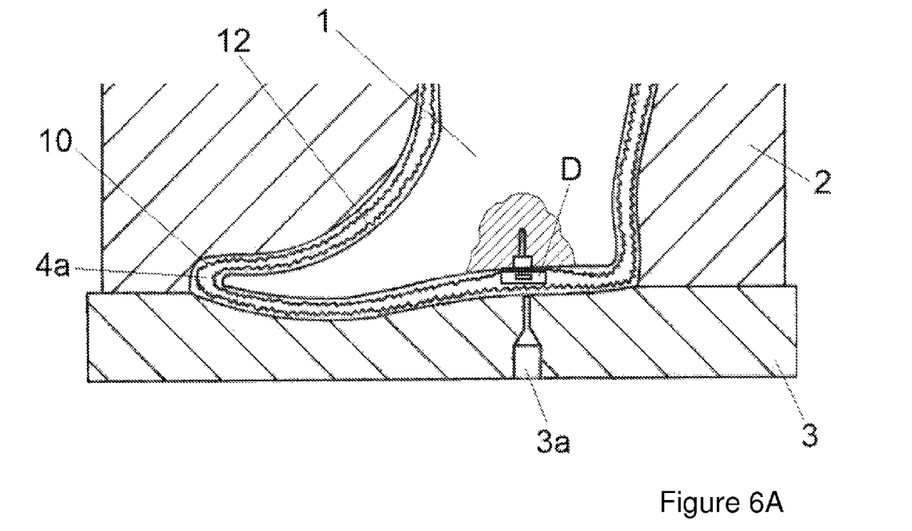
FIG. 6A is an enlarged view of FIG. 6.

Referring to FIG. 6A, it must be noted that the lining (12) is provided on a bottom with one or more holes for a corresponding number of diffusers (D) mounted on the bottom (1p) of the core (1); Each hole of the lining (12) is crossed by a diffuser (D).

In view of the above, the lining (12) perfectly adheres to the bottom (1p) of the core (1) and the diffusers (D) are disposed in external position on the lining (12).

Then the fabric upper (10) is inserted onto the core (1) in external position with respect to the lining (12). Therefore, in such a case, the intermediate space (4a) adapted to receive the plastic material in fluid state is created between the upper (10) and the lining (12).

Moreover, the fabric upper (10) is provided on the bottom (10p) with a continuous surface that prevents the diffusers (D) from ending outside of it.

It can be otherwise said that the diffusers (D) are disposed between the internal side of the lining (12) and the internal side of the fabric upper (10), specifically in the intermediate space (4a).

For this reason, also in this situation, the pointed head (31) of each injection nozzle (30) provided in the first lid (3) penetrates the fabric upper (10) before penetrating the central chamber (100c) of a corresponding diffuser (D).

When the injection of plastic material in fluid state is activated, the material delivered by the pointed head (31) of the nozzle (30) penetrates the central chamber (100c) of a diffuser (D) and is ejected from the diffuser (D) through the radial slots (100d).

In such a condition, the plastic material in fluid state that is ejected from the radial slots (100d) of the diffuser (D) is received in the intermediate space (4a) provided between the upper (10) and the lining (12), in order to generate the desired waterproofing layer (10a) between the upper (10) and the lining (12) after consolidation and in order to irreversibly join the upper (10) and the lining (12), as shown in FIG. 7.

Although according to the process of the invention the diffusers (D) of the plastic material in fluid state are mounted in the bottom (1p) of the core (1), it is understood that the process of the invention can be implemented also without the diffusers (D). In fact, the pointed head (31) of the nozzle (30) coming out of the hole of the first lid (30) simply needs to perforate the fabric upper (10) before starting to inject plastic material in fluid state. In this way the plastic material penetrates the intermediate space (4a) provided between the core (1) and the internal side of the fabric upper (10), thus creating the necessary internal coating layer (10a).

If the fabric upper (10) is to be coated with the lining (12)—and consequently both the fabric upper (10) and the lining (12) are inserted on the core (1)—the pointed head (31) of the injection nozzle (30) only perforates the fabric upper (10) and not the internal lining (12). In view of the above, the injection material in fluid state penetrates and consolidates in the intermediate space (4a) formed between the upper (10) and the lining (12).

Even if the detailed description is referred specifically to a boot, the method according to the invention is extended to any type of shoe provided with upper. It is evident that, if the shoe is not a boot, the shoe comprises a upper that does not provided with the tubular portion surrounding the leg and therefore the mould comprises a die (2) shorter the one showed in the Figures, in order to surround only the foot of the core (1).

I claim:

1. A process for manufacturing a shoe with a fabric upper, the process comprising:
    inserting the fabric upper onto a core of a mold, the core having a shape of a foot, the fabric upper having a shape of a sock, the fabric upper having an internal surface facing toward the core;
    fixing the core with the fabric upper inside the mold adapted to surround the core with the fabric upper attached thereto so as to form a gap between the core with the fabric upper attached thereto and the mold;
    piercing the fabric upper with pointed head of at least one injection nozzle; and
    injecting fluid plastic material with the at least one injection nozzle in an intermediate space between the fabric upper and the core so as to cover the internal surface of the fabric upper and then injecting the fluid plastic material inside the gap so as to form a coating layer of the fabric upper.

2. The process of claim 1, wherein the core has a bottom and the fabric upper has a bottom, the step of fixing comprising:
    fixing a lateral wall of the core inside the mold so as to form a lateral gap between the core and the mold; and
    closing the mold with a first lid so as to form a lower gap between the first lid and the bottom of the core, the lower gap communicating with the lateral gap, the at least one injection nozzle being cooperative with the first lid so that the pointed head pierces the bottom of the fabric upper.

3. The process of claim 2, further comprising:
    removing the first lid following the step of injecting;
    mounting a second lid onto the mold, the second lid having an additional injection nozzle; and
    delivering a fluid molding material into a cavity of the second lid so as to mold a sole under the bottom of the fabric upper.

4. The process of claim 1, further comprising:
    inserting a lining onto the core prior to the step of inserting the fabric upper, the fluid plastic material penetrating an intermediate space between the lining and the fabric upper.

5. The process of claim 1, the step of injecting comprising:
    injecting the fluid plastic material inside a diffuser fixed to the core and disposed in an intermediate space between the fabric upper and the core.

6. The process of claim 4, the step of injecting comprising:
    injecting the fluid plastic material inside a diffuser fixed to the core and disposed in an intermediate position between the fabric upper and the lining.

7. The process of claim 5, further comprising:
    fixing the diffuser to the core by a fixing pin protruding from a cylindrical plate of the diffuser;
    coupling the injection nozzle to a cylindrical chamber of the diffuser; and
    delivering the fluid plastic material by the injection nozzle into the cylindrical chamber so as to radially spread outwardly through radial slots formed in a lateral wall of the diffuser.

8. The process of claim 1, the mold having a first lid, the process further comprising:
    incorporating the at least one injection nozzle into the first lid.

9. The process of claim 1, the fluid plastic material being polyvinyl chloride.

* * * * *